(12) United States Patent
Hays

(10) Patent No.: US 6,705,041 B2
(45) Date of Patent: Mar. 16, 2004

(54) FISHING RODS

(76) Inventor: Roderick Simon Hays, The Old Barn, Down St. Mary, Crediton (GB), FX176 6EA ( * ) Notice: Subject to any disclaimer, the term of this patent is extended or adjusted under 35 U.S.C. 154(b) by 0 days.

(21) Appl. No.: 09/978,149

(22) Filed: Oct. 16, 2001

(65) Prior Publication Data

US 2002/0043015 A1 Apr. 18, 2002

Related U.S. Application Data

(60) Provisional application No. 60/241,394, filed on Oct. 18, 2000.

(30) Foreign Application Priority Data

Oct. 18, 2000 (GB) .............................. 0025580
Apr. 27, 2001 (GB) .............................. 0110387

(51) Int. Cl.$^7$ .............................. A01K 87/08
(52) U.S. Cl. .......................... 43/25; 43/21.2
(58) Field of Search .................... 43/25, 21.2

(56) References Cited

U.S. PATENT DOCUMENTS

| | | | | |
|---|---|---|---|---|
| 4,020,582 A | * | 5/1977 | Thelen ....................... 43/19.2 |
| 4,041,635 A | * | 8/1977 | Savage ........................... 43/25 |
| 4,651,461 A | * | 3/1987 | Williams ....................... 43/23 |
| 4,697,377 A | * | 10/1987 | Martin ........................... 43/23 |
| 4,785,495 A | * | 11/1988 | Dellis ....................... 16/111 R |
| 4,858,365 A | * | 8/1989 | Struntz .......................... 43/23 |
| 4,860,483 A | * | 8/1989 | Hlad .......................... 43/18.1 |
| 5,319,995 A | * | 6/1994 | Huang ....................... 74/551.8 |
| 5,363,586 A | * | 11/1994 | Balkenbush .................. 43/23 |
| 5,426,884 A | * | 6/1995 | Makowsky ................. 43/25.2 |

* cited by examiner

*Primary Examiner*—Charles T. Jordan
*Assistant Examiner*—Bret Hayes
(74) *Attorney, Agent, or Firm*—Kilyk & Bowersox, P.L.L.C.

(57) ABSTRACT

A carrying handle fastened to a fishing rod to facilitate lifting and handling of the fishing rod comprises a hand grip (11; 21) shaped and dimensioned for comfortable gripping in the hand, a clamp (12; 22) e.g. in the form of a diametrically split ring or split collar, which can be clamped securely to the fishing rod by tightening screw fasteners (20), and an arm (13; 14; 24) which connects the clamp (12; 22) to the hand grip (11; 21). The handle is secured to the fishing rod so that the hand grip (11; 21) extends alongside the rod below the fishing reel seat.

20 Claims, 5 Drawing Sheets

FISHING RODS

RELATED APPLICATIONS

This application claims the benefit of U.S. provisional patent application No. 60/241394 filed on Oct. 18, 2000, British Patent application No. 0025580.2 filed on Oct. 18, 2000 and British Patent application No. 0110387.8 filed on Apr. 27, 2001.

FIELD OF THE INVENTION

This invention is concerned with fishing rods. Some fishing rods, such as those used for sea fishing from boats, are relatively long and heavy and can be awkward or cumbersome to lift and carry whilst moving around on board a boat, such as when preparing to fish with a rod, or when stowing the rod at the end of fishing.

The present invention is for an object to make fishing rods easier and more convenient to handle.

SUMMARY OF THE INVENTION

In accordance with one aspect the invention provides a carrying handle for attachment to a fishing rod, comprising a hand grip shaped and dimensioned for comfortable gripping in the hand, a clamp for firm attachment to a fishing rod, and an arm interconnecting the clamp and the grip so that the grip extends generally alongside and spaced from the fishing rod when the handle is secured to the rod by the clamp.

In one presently preferred construction the handle has a pair of clamps connected by respective arms to opposite ends of the hand grip. With this arrangement a firm attachment of the hand grip to the rod is possible so that undesirable relative movements of the hand grip and fishing rod are eliminated or minimilised.

According to another preferred construction the handle has a single clamp from which the arm and hand grip extend outwardly and forwardly.

Conveniently the or each clamp includes a saddle fixed at the end of the arm, a clamping element movably coupled to the saddle and a tightening device for tightening the clamping element and saddle around a fishing rod. The saddle and clamping element can be arcuate, in particular substantially semicircular so that when tightened together around a fishing rod they form a substantially closed ring. The tightening device may comprise a releasable fastener, and in an especially convenient embodiment threaded screw fasteners are utilised. To avoid projections on which a fishing line could snag, or which could cause injury, each screw is engaged with a tapped hole in one part, e.g. the saddle, and has the screw head accommodated in a counterbore provided in the other part, e.g. the clamping element.

In an especially convenient construction the or each clamp comprises an axially split collar which can be opened sufficiently to enable the collar to be passed over the end of the fishing rod. When the handle is adjusted to the required position, the collar is clamped around the rod, such as by one or more fasteners extending between the parts separated by the axial split. The position of the split can be aligned with the hand grip and connection arm which may also be split, at least part way along their length from the collar, and the clamping fasteners can then be located between the split parts of the hand grip and/or connecting arm for holding these parts firmly together when the fasteners are tightened.

In accordance with another aspect the invention resides in a fishing rod fitted with a carrying handle attached securely thereto so that a hand grip of the handle extends alongside the fishing rod in a region below the fishing reel seat of the rod. The handle is preferably as described above.

DESCRIPTION OF THE DRAWINGS

A clear understanding of the invention will be gained from the following description of some preferred embodiments, reference being made to the accompanying drawings, in which.

DESCRIPTION OF THE PREFERRED EMBODIMENT

Figure 1:
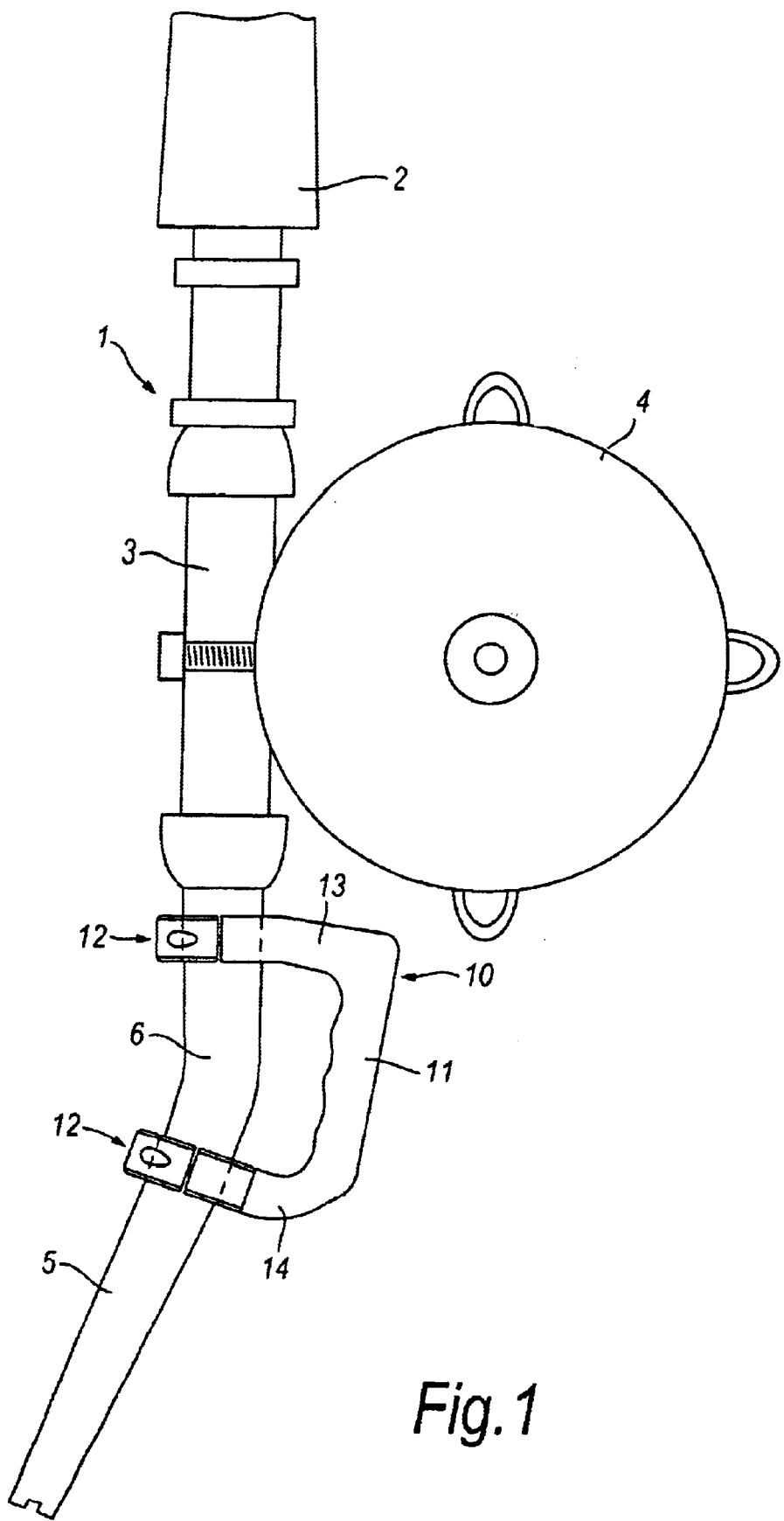
FIG. 1 is a schematic side view illustrating a fishing rod equipped with a carrying handle according to the invention.
Figure 2:
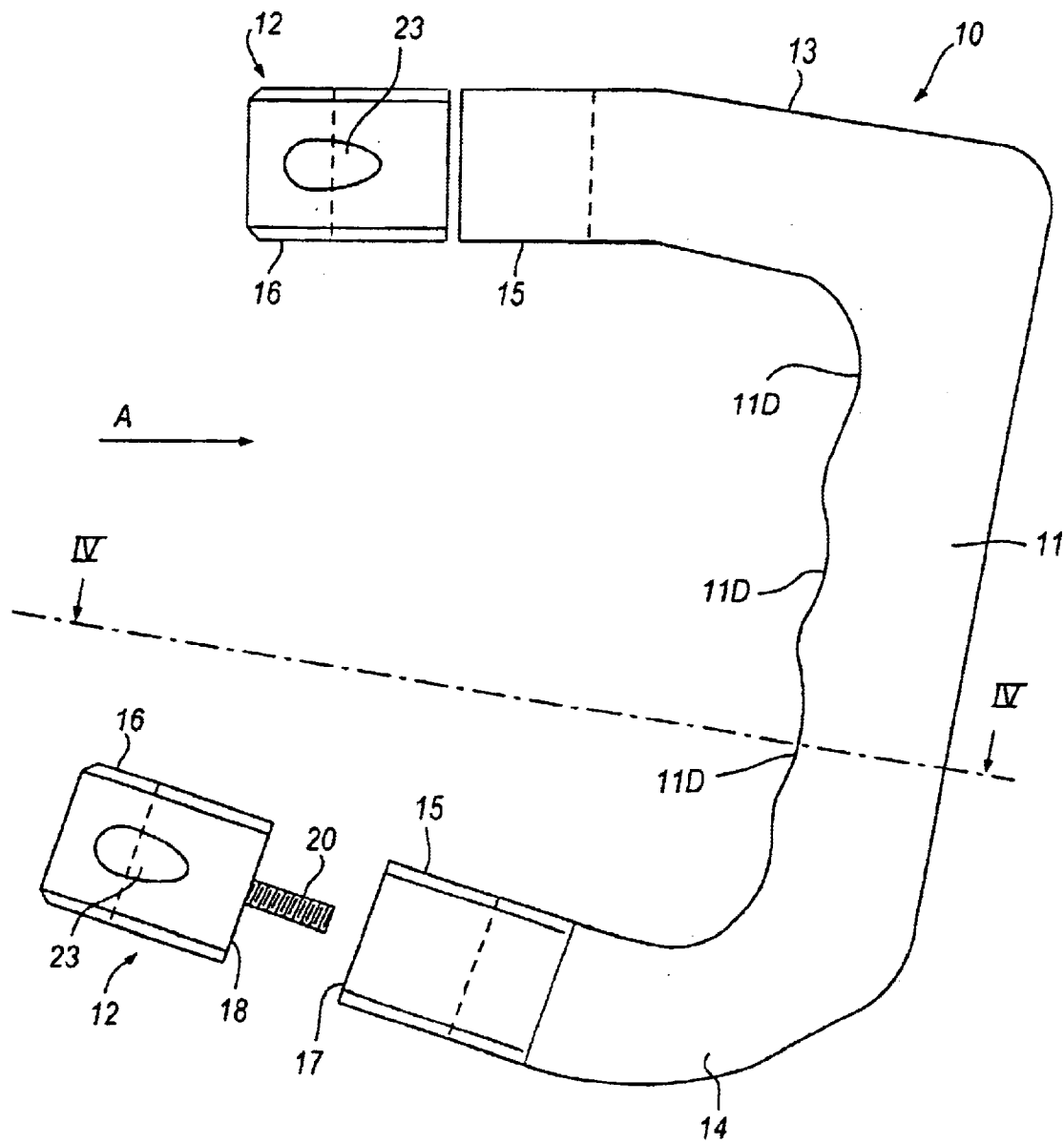
FIG. 2 shows the carrying handle in side elevation and with the lower clamp ring open.
Figure 3:
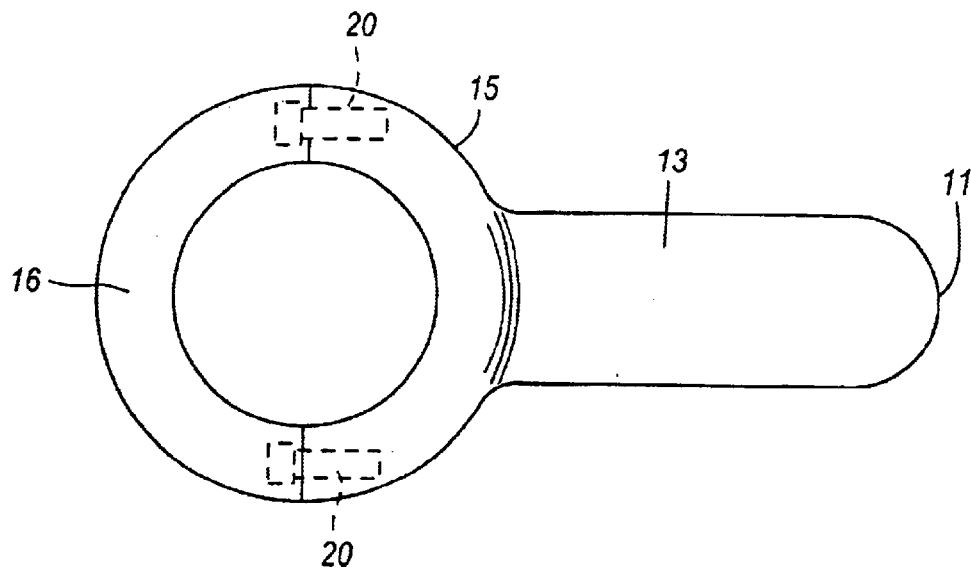
FIG. 3 is an upper end elevation of the carrying handle shown in FIG. 2.
Figure 4:
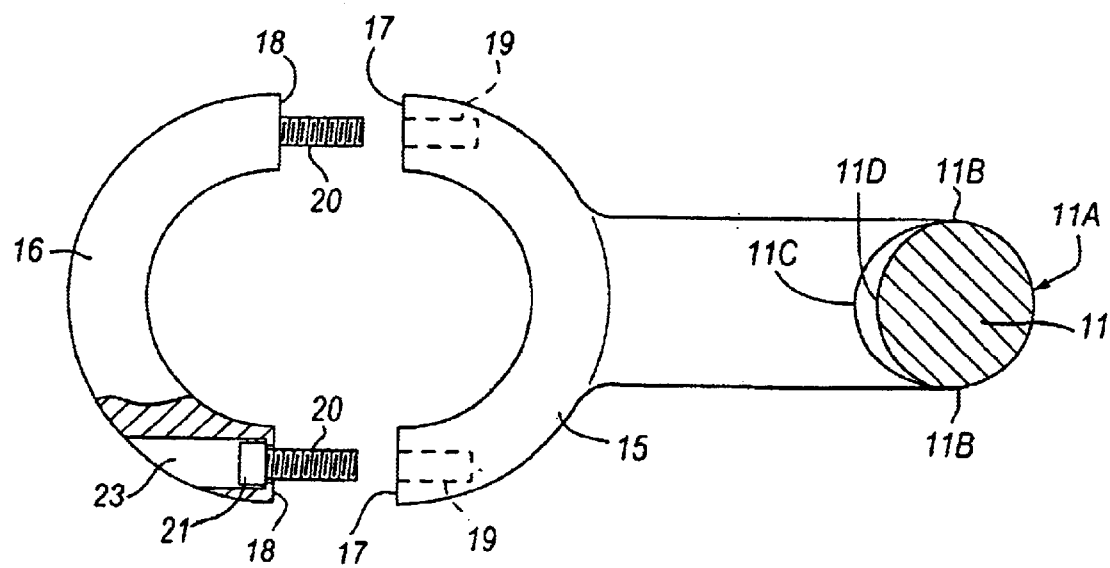
FIG. 4 is a section taken along IV—IV of FIG. 2 and showing the clamping element in partial section.
Figure 5:
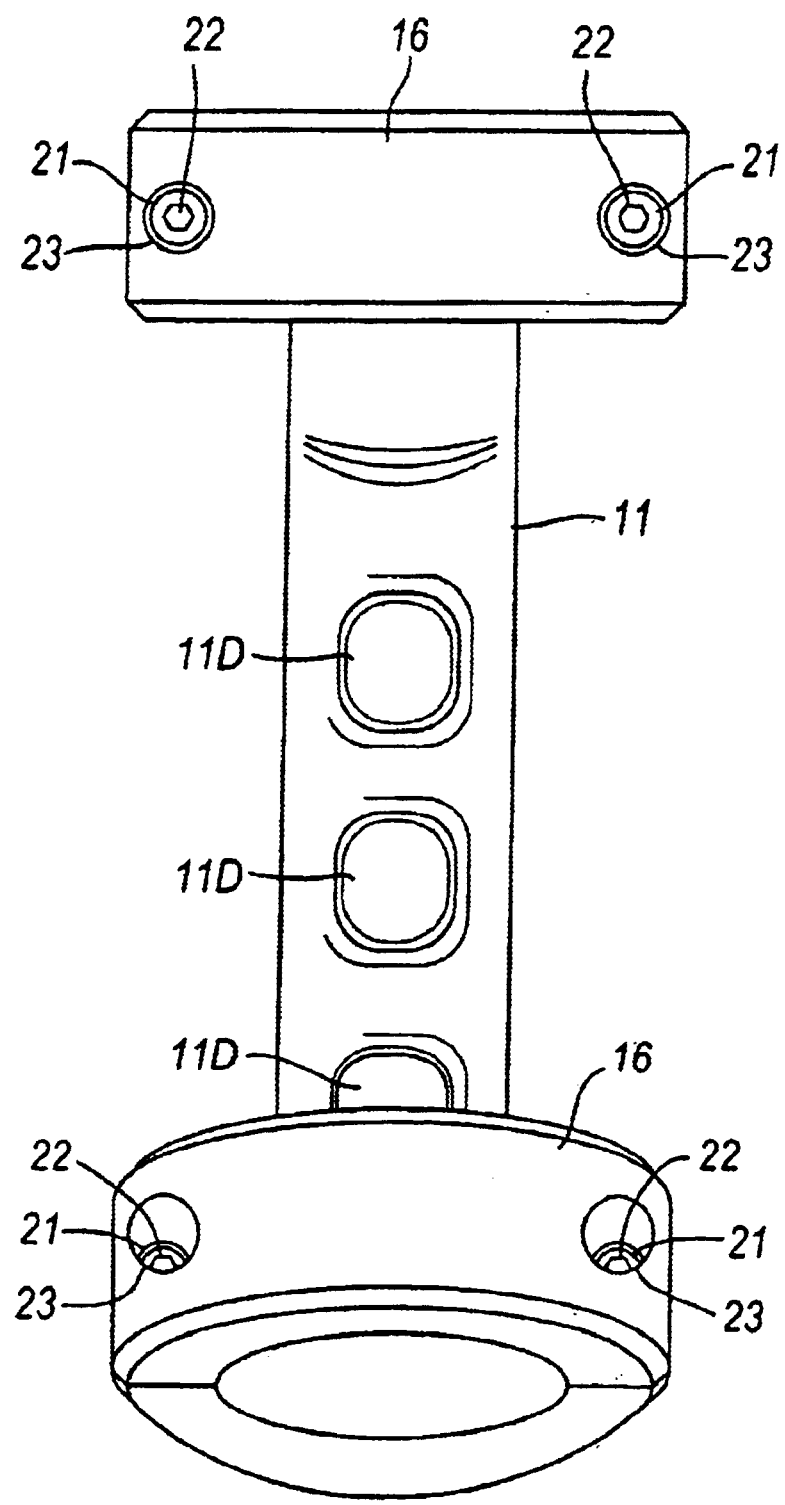
FIG. 5 shows the carrying handle as viewed in the direction of arrow A in FIG. 2.

The fishing rod 1 illustrated in FIG. 1 is conventional, only the lower or proximal end of the rod being shown. The rod includes a foregrip 2 whereat the rod in commonly grasped in the hand during fishing, a reel seat 3 at which the fishing reel 4 is mounted on the rod, and a lower butt end extension 5 which includes a slight bend 6 at a short distance below the reel seat, and the lower which can be inserted into a rod rest during fishing.

In accordance with the present invention a carrying handle 10 is provided and is attached securely to the fishing rod 1 below the reel seat 3 and in the region of the bend 6 in the rod extension 5. The handle 10 has a hand grip 11 in the form of a bar which is shaped and dimensioned so that it sits comfortably in the hand. The hand grip has a substantially semicylindrical outer surface 11A parallel side surfaces 11B and a substantially semicylindrical inner surface 11C with shallow depressions 11D for location of the fingers of the hand in which the hand grip is grasped and held. For mounting the hand grip 11 firmly to the fishing rod 10 the handle includes a pair of clamps 12 which are connected to the opposite ends of the grip 11 by respective arms 13, 14. The clamps 12 are annular and each consists of a diametrically split ring with a substantially semicircular saddle 15 rigidly fixed to the respective arm 13, 14, and a clamping element 16 also substantially semicircular in form. The saddles and clamp elements have end faces 17, 18 which confront each other when the clamp rings are assembled, and tapped blind holes 19 open at the end faces 18 of the saddle whereas the clamping elements 16 have through holes extending from their outer arcuate surfaces to the faces 18 for receiving machine screws 20. The screws 20 have cylindrical heads 21 with hexagonal recesses 22 for engagement of a tool, such as an Allen key, for tightening the clamps, which screw heads fit within counterbores 23 provided in the clamping elements so that the screws 20 do not protrude beyond the periphery of the clamps. Of course the threaded ends of the screws 20 are inserted into tapped holes 19 in the saddles.

In use the carrying handle 10 is attached securely to the fishing rod, by opening the clamps 12, reassembling the clamps around the butt 5 of the fishing rod and tightening the screws 20 with an appropriate tool so that the handle is filed firmly to the fishing rod and essentially rigid therewith. The handle is ideally positioned as shown in FIG. 1 to be below and in line with the reel 4 so that it does not constitute an incumbrance during fishing. The handle 10 facilitates carrying and general handling of the fishing rod. It is free of sharp projections or corners which could be a source of injury or on which a fishing line could snag, so that the performance of the fishing rod is not impaired in any way by the carrying handle attachment.

Figure 6:
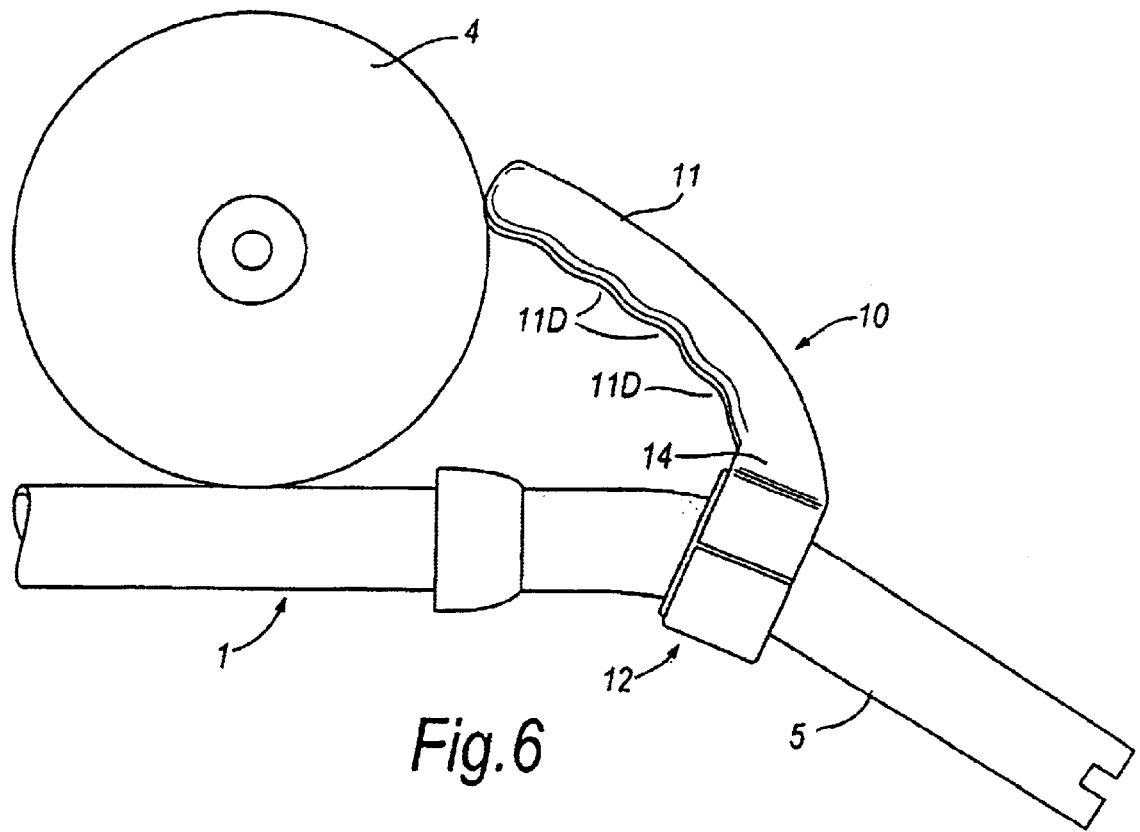
FIG. 6 is a schematic illustration of another embodiment.

Fishing rods for big game fishing are frequently carried in a generally horizontal orientation with the reel uppermost due to their design. Due to the relatively heavy weight of the reel there is a tendency for the rod to twist in the hand and this puts an additional strain on the hand and wrist of the person carrying the rod. The handle of the invention can be fitted to the rod so that the centre of gravity of the rod lies in the region of the handle grip whereby this strain is alleviated. Although the fishing rod 1 has been described as having a bend 6 with the handle 10 being configured to span the bend, it will be appreciated that not all fishing rods are bent in this way. The invention is equally applicable to fishing rods which are straight and the handle will then have a configuration so that the clamps 12 are in axial alignment instead of being angularly off-set as shown in the drawings. In addition, the clamps may include removable and/or interchangeable inserts for adapting the clamps to fit rods of different diameters. Other modifications are also possible without departing from the spirit and scope of the invention. By way of example it may be mentioned that different clamp arrangements are possible and will occur to those skilled in the art. For example, the clamping elements and saddles could be hinged together at one end and be interconnected by tightening screws at the other end. Also, handle constructions are possible in which the grip is secured to the fishing rod by a single clamp. An embodiment of such a handle is shown in FIG. 6, the clamp 12 in this embodiment being connected at one end of the grip 11 and being disposed for attachment to the rod butt 5 so that the grip 11 extends away from the clamp 12 generally alongside the rod towards the reel 4. Other details of the handle 10 may be described above in connection with the embodiment of FIGS. 1 to 5.

Figure 7:
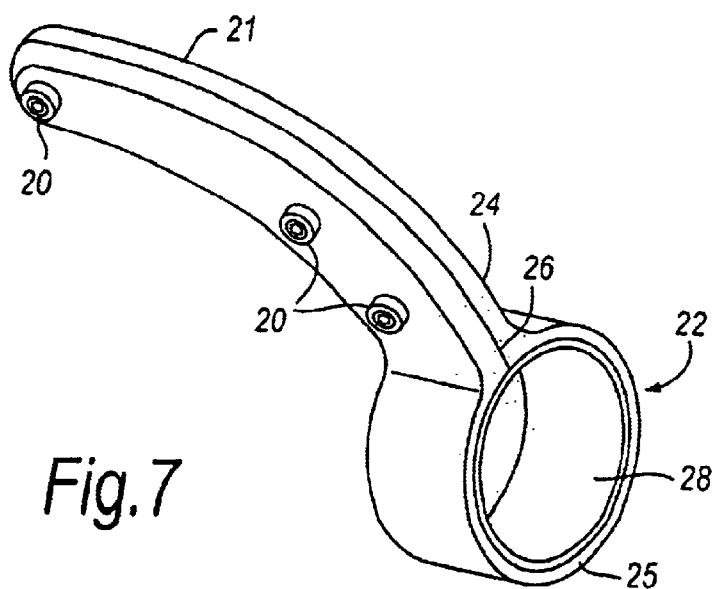
FIG. 7 is a perspective view of a further embodiment of fishing rod carrying handle according to the invention.

Illustrated in FIG. 7 is an embodiment in which, like the handle of FIG. 6, has a single clamp from which the hand grip 21 and its connection arm 24 extend outwardly and forwardly. The clamp 22 in this embodiment takes the form of an axially split collar 25, the axial split 26 being in a radial plane bisecting the connecting arm 24 and the hand grip 21 which are also split longitudinally in this plane. A plurality of fasteners, namely screws 20 as used in the previously embodiments, extend between the split parts of the grip 21 and arm 24 for clamping these parts firmly together when the screw are tightened. When the screws 20 are slackened, the split parts of the handle can be moved apart enough to open the collar 25 sufficiently to enable it to be passed over the butt end of a fishing rod and adjusted to the desired position of the handle along the rod. The screws 20 are then tightened to secure the handle in position by clamping the split collar 25 around the rod. The handle is suitably made of metal, and to avoid risk of damage to the rod the collar can be fitted with a lining sleeve 28, e.g. of plastic material such as Delrin.

Of course modifications to the described handles are possible without departing from the scope of the invention. For example, the connecting arm between the hand grip and the clamp could include a pivot mechanism enabling the angle of the hand grip relative to the clamp, and hence the fishing rod, to be adjusted. A suitable mechanism would include toothed washers rotationally fast with two respective parts of the handle and which can be either loosened apart to enable angular adjustment of the hand grip or tightened together to lock the hand grip in the adjusted position, by means of a screw fastener extending through the toothed washers.

What is claimed:

1. A fishing rod having a fishing reel seat, a butt end extension below the seat, and a carrying handle, the carrying handle comprising a bar-shaped hand grip including first and second ends, a clamp, and an arm, wherein the bar-shaped hand grip has a length for sitting comfortably in a hand, the clamp tightly embraces the butt end extension, the arm extends outwardly from the clamp and has an inner end fixed rigidly to the clamp and an outer end fixed to the first end of the hand grip, the carrying handle is clamped to the butt end extension with the hand grip positioned for alignment with a reel mounted on the reel seat, the arm has a length between the inner and outer ends that is less than the length of the hand grip, and the hand grip is adjacent to and approximately parallel to the rod, with the second end being free and spaced from the rod, and the hand grip enables carrying of the rod in a substantially horizontal orientation with the reel uppermost.

2. The fishing rod according to claim 1, wherein the clamp is annular for extending about the fishing rod and has a split to enable the clamp to be tightened around the fishing rod.

3. The fishing rod according to claim 2, wherein the handle includes at least one tightening device for tightening together portions of the clamp separated by the split.

4. The fishing rod according to claim 3, wherein the at least one tightening device comprises a screw fastener.

5. The fishing rod according to claim 2, wherein the clamp includes a saddle element rigidly fixed to the arm, and a clamping element.

6. The fishing rod according to claim 5, wherein the clamp comprises a diametrically split ring with substantially semi-circular saddle and clamping elements.

7. The fishing rod according to claim 2, wherein the clamp comprises a split collar.

8. The fishing rod according to claim 7, wherein the collar is split in a radial plane bisecting the arm and the hand grip, parts of the hand grip and arm being separated by the split and being tightened together by one or more fasteners.

9. The fishing rod according to claim 1, wherein the hand grip is bar-shaped with substantially semi-cylindrical inner and outer surfaces, and finger depressions spaced apart along the inner surface for locating the fingers of a hand in which the hand grip is held.

10. The fishing rod according to claim 1, wherein the clamp includes an inner lining sleeve for protecting the fishing rod.

11. A fishing rod having a fishing reel seat, a butt end extension below the reel seat, and a carrying handle, the carrying handle comprising a bar-shaped hand grip and first and second arms, the first arm being arranged closer to the fishing reel seat than is the second arm, wherein the bar-shaped hand grip has a length for sitting comfortably in a hand, the first and second arms each including inner ends each fixed rigidly to the butt extension and extending outwardly from the rod and each including outer ends each fixed to the hand grip, each of the first and second arms has a respective length between the inner and outer ends that is less than the length of the hand grip and the length of the first arm is greater than the length of the second arm, the hand grip extends adjacent to and approximately parallel to the rod, and the hand grip is positioned for alignment with a reel mounted on the reel seat to enable carrying of the rod in a substantially horizontal orientation with the reel uppermost by way of the carrying handle.

12. The fishing rod according to claim 11, wherein the handle includes first and second clamps attached to the fishing rod, the first and second arms each interconnecting a respective clamp and a respective end of the hand grip.

13. The fishing rod according to claim 12, wherein at least one of the clamps is annular and extends about the fishing rod, the at least one clamp being split and tightened around the fishing rod.

14. The fishing rod according to claim 13, wherein the handle includes at least one tightening device tightening together portions of the at least one clamp separated by the split.

15. The fishing rod according to claim 14, wherein the at least one tightening device comprises a screw fastener.

16. The fishing rod according to claim 13, wherein the at least one clamp includes a saddle element rigidly fixed to a respective arm, and a clamping element adjustably connected to the saddle element.

17. The fishing rod according to claim 16, wherein the at least one clamp comprises a diametrically split ring, the saddle and clamping elements being substantially semi-circular.

18. The fishing rod according to claim 13, wherein the at least one clamp comprises a split collar.

19. The fishing rod according to claim 11, wherein the hand grip is bar-shaped with substantially semi-cylindrical inner and outer surfaces, and finger depressions spaced apart along the inner surface for locating the fingers of a hand in which the hand grip is held.

20. The fishing rod according to claim 12, wherein at least one of the clamps includes an inner lining sleeve for protecting the fishing rod.

* * * * *